(12) United States Patent
Lykkegaard

(10) Patent No.: US 10,604,349 B2
(45) Date of Patent: Mar. 31, 2020

(54) LINE SORTER WITH ADJUSTABLE TRACK LENGTH

(71) Applicant: BEUMER Group A/S, Aarhus N (DK)

(72) Inventor: Uffe Lykkegaard, Aarhus C (DK)

(73) Assignee: Beumer Group A/S, Aarhus N (DK)

( * ) Notice: Subject to any disclaimer, the term of this patent is extended or adjusted under 35 U.S.C. 154(b) by 0 days.

(21) Appl. No.: 15/781,730

(22) PCT Filed: Dec. 14, 2016

(86) PCT No.: PCT/DK2016/050429
§ 371 (c)(1),
(2) Date: Jun. 6, 2018

(87) PCT Pub. No.: WO2017/108048
PCT Pub. Date: Jun. 29, 2017

(65) Prior Publication Data
US 2018/0362258 A1    Dec. 20, 2018

(30) Foreign Application Priority Data
Dec. 22, 2015 (DK) .................. 2015 70860

(51) Int. Cl.
*B65G 23/44* (2006.01)
*B65G 21/14* (2006.01)

(52) U.S. Cl.
CPC .............. *B65G 23/44* (2013.01); *B65G 21/14* (2013.01)

(58) Field of Classification Search
CPC .................. B65G 23/44; B65G 21/14
(Continued)

(56) References Cited

U.S. PATENT DOCUMENTS

| 2,333,926 A | 11/1943 | Hapman |
| 2,648,423 A | 8/1953 | Black |

(Continued)

FOREIGN PATENT DOCUMENTS

| CN | 100415392 C | 9/2008 |
| DE | 2121848 | 11/1972 |

(Continued)

OTHER PUBLICATIONS

English Abstract for JPS5936009A from Espacenet European Patent Office dated May 30, 2018.
(Continued)

*Primary Examiner* — William R Harp
(74) *Attorney, Agent, or Firm* — Woodard, Emhardt, Henry, Reeves & Wagner, LLP

(57) ABSTRACT

The invention relates to a line sorter for sorting items of various shapes, sizes and weights, in particular postal parcels or airport baggage. The line sorter (102) has a closed loop of coupled sorting carts or slats provided for moving along a loop track formed by an upper track section (104), a lower track section (106), one end track section connecting the upper and lower track sections at each of two ends of the line sorter, and one or more adjustment elements also forming part of the track loop. One of the end track sections 108, 109 can be longitudinally displaced relative to the upper and lower track sections to increase or decrease the resulting length of the track loop. The adjustment element(s) (210, 211) is movably mounted between said end track section and an adjacent upper or lower track section. A wedge shaped portion of the adjustment element is arranged for adjustable engagement with a correspondingly shaped portion of said end track section, or the upper or lower track section. This allows adjustment of a length of the track loop in accordance with displacement of said end track section, (Continued)

and still close a gap in the track by means of the adjustment element.

18 Claims, 5 Drawing Sheets

(58) Field of Classification Search
USPC .................................................. 198/594, 812
See application file for complete search history.

(56) References Cited

U.S. PATENT DOCUMENTS

| | | | |
|---|---|---|---|
| 3,637,066 A | | 1/1972 | Idskov |
| 3,870,142 A | | 3/1975 | Woltjen |
| 5,489,056 A | * | 2/1996 | Staschewski .......... B65G 23/44 226/173 |
| 5,921,378 A | | 7/1999 | Bonnet |
| 6,041,909 A | * | 3/2000 | Shearer, Jr. .......... B65G 47/844 198/370.02 |
| 6,247,581 B1 | | 6/2001 | Oswald |
| 6,814,216 B2 | * | 11/2004 | Veit ........................ B07C 5/362 198/370.02 |
| 7,438,176 B2 | * | 10/2008 | Furuuchi ................ B65G 21/14 198/347.1 |
| 2004/0118663 A1 | | 6/2004 | Gaeddert |
| 2011/0056797 A1 | | 3/2011 | Tsai |
| 2011/0073443 A1 | | 3/2011 | Trivetle |

FOREIGN PATENT DOCUMENTS

| | | |
|---|---|---|
| DE | 2511420 A1 | 9/1976 |
| DE | 102007054730 A1 | 5/2009 |
| DE | 102011017525 A1 | 10/2012 |
| EP | 0924147 A1 | 6/1999 |
| FR | 2508011 A1 | 12/1982 |
| GB | 2 099 775 A | 12/1982 |
| JP | 5936009 A | 2/1984 |
| WO | WO 98/31614 | 7/1998 |
| WO | WO 02/26602 A2 | 4/2002 |

OTHER PUBLICATIONS

English abstract from ESPACENET European Patent Office for DE2511420A1 on May 30, 2018.
International Search Report and Written Opinion Issued in related PCT/DK2016/050429 dated Mar. 27, 2017.
Machine translation of DE102011017525A1 by Lexis Nexis Total Patent on Jun. 5, 2018.
Machine translation of DE102007054730A1 by Lexis Nexis Total Patent on Jun. 5, 2018.
Machine translation of FR2508011A1 by Lexis Nexis Total Patent on Jun. 5, 2018.

* cited by examiner

LINE SORTER WITH ADJUSTABLE TRACK LENGTH

FIELD OF THE INVENTION

The invention relates to a line sorter for sorting items of various shapes, sizes and weights, in particular postal parcels or airport baggage. The invention is particularly related to a line sorter with an adjustable track length which is advantageous for a closed loop of sorting carts or slats.

BACKGROUND OF THE INVENTION

A sorter is a device able to sort items according to their identification and by loading or inducting the items onto the sorter and unloading, i.e. discharging them, at a discharge in accordance with the identification and thus into one or more discharges dedicated the items.

Sorters of the type as the present invention are typically suited for sorting several thousands of items per hour. Thus, e.g. a substantial amount of energy may be used by the system and some acoustic noise may also be generated. Furthermore, due to a need for high performance, e.g. in terms of number of sorted items per hour, but also including a need for extreme reliability, each part of the system must be engineered to suit these needs.

Line sorters are known, where a closed loop of coupled sorting carts or slats for carrying items to be sorted move on a track loop, e.g. with wheels. In case of long line sorters, e.g. lengths of 10-100 m, it is a problem that the length of the closed loop of carts or slats will vary, e.g. according to temperature (summer/winter) and due to wear in the couplings. Such mismatch between length of the track loop and the closed loop of coupled carts or slats will introduce extra acoustic noise and vibrations during operation, and it may cause extra wear on both tracks and couplings, and it may even cause breakdown. This problem can be solved by introducing a length adjustment mechanism on some of or all of the carts or slats in the closed loop. However, such adjustment mechanism adds extra costs to the sorter system, and the adjustment mechanism in itself introduces a potential source of error. Further, a manually operated length adjustment on individual carts or slats involves a complicated procedure which requires that the sorter is stopped, and thus it is required that the sorter is out of operation for a period of time.

SUMMARY OF THE INVENTION

Thus, in order to solve the above problems or other issues, it has been appreciated that an improved line sorter is of benefit, and in consequence, the present invention has been devised.

It may be seen as an object of the present invention to provide an improved line sorter which preferably alleviates, mitigates or eliminates one or more of the above or other disadvantages singly or in any combination.

In particular, it may be seen as an object of the invention to provide a line sorter with an improved reliability and immunity to a variation in length of the closed loop of coupled sorting carts or slats moving on the track loop, e.g. caused by wear in the couplings between adjacent carts or slats and/or caused by temperature changes.

In a first aspect, the invention provides a line sorter for sorting items of various shapes, sizes and weights, such as postal parcels or airport baggage, the line sorter comprising an upper track section, a lower track section, one end track section connecting the upper and lower track sections at each of two ends of the line sorter, wherein at least one of the end track sections is mounted so as to allow longitudinal displacement of said end track section relative to the upper and lower track sections, at least one adjustment element, wherein the upper track section, the lower track section, and the end track sections form a track loop together with the adjustment element, a closed loop of coupled sorting carts or slats coupled at couplings and being arranged for moving along the track loop, at least one position dedicated induction of items onto the sorter, such as by an induction, and a plurality of discharges for sorting one or more items into their respective discharge, wherein the at least one adjustment element is movably mounted between said end track section and an end of one of the upper and lower track sections, wherein the at least one adjustment element has a wedge shaped portion arranged for adjustable engagement with a correspondingly shaped portion of one of: said end track section, and said end of one of the upper and lower track sections, so as to allow adjustment of a length of the track loop in accordance with displacement of said end track section relative to the upper and lower track sections.

Hereby an improved line sorter is provided. The line sorter may be seen to be advantageous, since the combination of the moveable adjustment element forming part of the track loop and at least one of the end track sections being longitudinally displaceable allows a rather simple way of adjusting the length of the track loop. The displaceable end track section allows adjustment of the track loop length, while the adjustment element serves to fill a corresponding gap in the track upon corresponding movement, e.g. if the end track section is displaced in a direction away from the upper and lower track sections to increase the length of the track loop. Hereby a smooth track interface can be provided at the track interface formed between the wedge shaped portion and the correspondingly shaped portion of an adjacent track section.

Thus, the track loop length can be matched to the actual length, or variation in length, of the closed loop track of coupled sorting carts or slats. This eliminates the need for any length adjustment mechanism on the sorting carts or slats or their mutual couplings. Therefore, the sorting carts or slats can be more simple with fewer components, thus more reliable, and thus also possible to manufacture at a low cost.

Further, the length adjustment can be performed without interrupting operation of the sorter line, since the adjustment does not involve the moving sorting carts or slats. Even in simple versions where the length adjustment according to embodiments of the invention is performed manually, it is possible to implement the adjustment mechanism so that only simple operations are required.

Still further, the length adjustment mechanism is suited for implementing in versions where the length adjustment is self-adjusting, either fully or semi-automatically. Spring arrangements and/or controllable actuators may be used to control the position of the adjustment element and position of the displaceable end track section. E.g. with the purpose of self-adjusting the length of the track loop to provide a predetermined tension of the closed loop of coupled sorting carts or slats.

With such functional way of adjusting track loop length, the line sorter according to the first aspect can be operated such that the track loop length can always be optimized to match the length of the closed loop of coupled sorting carts or slats, so as to provide an optimal moving operation, even at high speeds. This is advantageous with respect to such as: low acoustic noise and vibration levels, limited mechanic wear, high operational availability, and low energy consumption.

Even on large line sorters, the end track section can be manufactured as a rather small component, thus being easy to displace relative to the larger upper and lower track sections. The upper and lower track sections, which are larger components, can then be mounted fixed to the ground or floor.

By 'longitudinal direction' is understood a direction along a longitudinal axis formed by the line sorter, i.e. a direction of motion on the upper or lower track section of the sorting carts or slats when in operation.

Preferred features and embodiments will be described in the following.

It is to be understood that the line sorter may comprise more than one of the defined adjustment elements. In one embodiment, the line sorter comprises at least a first adjustment element located to provide a track interface between an upper part of said end track section and an end of the upper track section, and wherein at least a second adjustment element is located to provide a track interface between a lower part of said end track section and an end of the lower track section. In another preferred embodiment, the line sorter comprises at least a first adjustment element located to provide a track interface between an upper part of said end track section and an end of the upper track section, and wherein at least a second adjustment element is located to provide a track interface between an opposite end of the upper track section and the opposite end track section. In another preferred embodiment, the line sorter comprises at least a first adjustment element located to provide a track interface on one side of a track interface between the end track section and an adjacent one of the upper and lower track sections, and wherein at least a second adjustment element is located to provide a track interface on the opposite side of a said track interface. In a further embodiment, the two above-mentioned embodiments are combined to a line sorter embodiment comprising four adjustment elements, namely two positioned between the end track section and the upper track section, one on each side, and two positioned between the end track section and the lower track section, one on each side. In yet another embodiment, two adjustment elements are provided on each side between one end track section and one end of the upper track section, and two adjustment elements are provided on each side between the opposite end track section and the opposite end of the upper track section, since in some applications it may not be necessary to provide adjustment elements on the lower part of the track.

It is further to be understood that one, two, three or four further adjustment elements may also be positioned to interface the opposite end track section, which is then preferably also displaceable in relation to the upper and lower track sections. With both of the end track sections being displaceable in a longitudinal direction in relation to the upper and lower track sections, it is possible to accommodate a larger track loop length adjustment.

The wedge shaped portion of the at least one adjustment element is preferably arranged for adjustable engagement with a correspondingly shaped portion of said end track section. Preferably, the at least one adjustment element has a portion arranged to fit to an end of one of the upper or lower track sections. It is to be understood that the correspondingly shaped portion may alternatively or additionally be arranged on an adjacent one of the upper and lower track sections. Especially, the at least one adjustment element may have a wedge shape on one side arranged to face a correspondingly shaped portion of said end track section and a second wedge shape on an opposite side and being arranged to face a correspondingly shaped portion of an end of one of the upper and lower track sections.

The at least one adjustment element is preferably movable in a plane parallel with a plane formed by the upper or lower track section, especially the at least one adjustment element has a plane surface and is movably mounted to move in a plane parallel with said plane surface. Hereby, it is possible to provide a smooth track interface between plane track surfaces of the end track section and an adjacent one of the upper and lower track sections.

A spring arrangement may serve to force the wedge shaped portion of the at least one adjustment element into engagement with said correspondingly shaped portion so as to close a gap in the track loop. Such spring arrangement can be used to automatically move the adjustment element, preferably along one line, so as to provide a smooth track interface upon the end track section being longitudinally displaced. Alternatively, or additionally, a controllable actuator may be arranged to move the at least one adjustment element, preferably the controllable actuator is arranged to move the at least one adjustment element both in and out of engagement with said correspondingly shaped portion so as to allow increasing or decreasing the length of the track loop. Hereby, it is possible to provide a manually or automatically controllable movement of the adjustment element, thereby allowing both increasing and decreasing the length of the track loop without any obstacle effect from the engagement between the wedge shaped portion and said correspondingly shaped portion.

A spring arrangement may serve to force the displaceable end track section away from the upper and lower track sections, so as to increase the length of the track loop. With such spring arrangement, it is possible to adjust the track loop length in an automatic way, so as to provide a predetermined tension of the closed loop of coupled carts or slats by properly selecting the spring arrangement accordingly, and/or by providing an adjustable spring force of the spring arrangement. Alternatively, or additionally, a controllable actuator is arranged to move the end track section relative to the upper and lower track sections, so as to allow adjustment of the length of the track loop. Preferably, the controllable actuator is arranged to move the end track section in two directions so as to allow increasing or decreasing the length of the track loop.

The adjustment element is preferably movable at least along a direction in one plane. Preferably, the adjustment element is movable along an axis providing an angle of 50°-130° to a longitudinal axis of the line sorter, such as providing an angle of 80°-100° to a plane formed by the upper or lower track sections, more specifically along an axis being transverse or substantially transverse to the longitudinal axis.

Preferably, the at least one adjustment element is positioned so as to form part of the track loop on a plane portion of the track loop, e.g. on a plane and horizontal part of the track. Preferably, the end track section comprises a plane track part with an end part arranged for adjustable engagement with the wedge shaped portion of the adjustment element. Thus, in preferred embodiments, the displaceable end track section comprises a curved track part and at least a short plane track part.

Preferably, the adjustment element has a plane surface aligned with surfaces of adjacent surfaces of the end track section and an adjacent upper or lower track section, so as to provide a smooth track.

Preferably, said wedge shaped portion forms a straight track surface interface with said correspondingly shaped portion. Especially, said straight track surface interface forms an angle of 10°-60°, more preferably 20°-40°, with the longitudinal axis of the line sorter.

In a preferred embodiment, the adjustment element is mounted to be movable along an axis being transverse or substantially transverse to the longitudinal axis of the line sorter, and wherein said wedge shaped portion forms a straight track surface interface with said correspondingly shaped portion, wherein said straight track surface interface forms an angle of 20°-40° with the longitudinal axis of the line sorter.

It is to be understood that the adjustment element may be mounted to be movable along an axis which forms an angle of such as 10°-80°, e.g. 30°-50°, with a longitudinal axis of the line sorter.

The at least one adjustment element is preferably formed by different materials, such as steel, aluminium and plastic.

It is to be understood that the invention according to the first aspect is applicable for a larger number of different propulsion systems for moving the closed loop of coupled carts or slats. In one embodiment of the line sorter, a linear synchronous motor (LSM) propulsion system is arranged for moving said closed loop of coupled sorting carts or slats along the closed loop track, the linear synchronous motor propulsion system comprising a stationary travelling field stator cooperating with a plurality of permanent magnets positioned on the carts or slats. Especially, in connection with such an LSM propulsion system, an encoder may be arranged in relation to the linear synchronous motor so as to detect a distance between the carts, and wherein the encoder is connected to an actuator serving to move the adjustable element so as to adjust the length of the closed loop track accordingly. Such encoder may be used for automatic detection of a distance between adjacent carts or slats, so as to determine if adjustment of the track loop length is necessary, e.g. automatically by controlling an actuator for displacing the end track section accordingly.

Preferably, a plurality of said carts or slats have a set of rolling devices, such as a set of wheels, arranged for operably interaction with the closed loop track. E.g. each cart or slat may have at least two sets of wheels. Especially, there is at least one set of rolling devices for each of the carts or slats in said closed loop of coupled carts or slats. E.g. each cart or slat comprises at least one wheel positioned on each side, seen in a moving direction. The rolling devices, such as wheels, cooperate with the track sections so as to control the position of the carts relative to the track and/or to carry the carts along the upper, lower and end track sections. The wheels or rolling devices keeps the carts substantially horizontally when in operation and when the carts are provided at, or moving in, the upper and/or lower track sections. Preferably, the couplings between adjacent sorting carts or slats enable the carts or slats to pivot relative to each other about a horizontal or substantially horizontal pivot axis when in operation.

A plurality of, or each, cart or slat in the closed loop of coupled sorting carts or slats may comprise one or more transport surfaces for receiving, transporting and/or discharging the items. Especially, the one or more transport surfaces may comprise one or more cross-belts.

In preferred embodiments, the upper and lower track sections are straight and flat track sections, e.g. each forming track surfaces in one plane only, e.g. in a horizontal plane only. Preferably, the end track sections comprise a semi-circular shaped track portion, and wherein said displaceable end track section comprises straight upper and lower track parts, so as to form a straight and plane track interface with respective first and second adjustment elements with plane track surfaces.

The line sorter may comprise a double track, i.e. two separate tracks arranged with a mutual distance of such as 1-100 cm.

The upper and lower track sections between the end track sections may have a length of 1 m to 500 m, such as 3 m to 100 m.

According to embodiments of the invention, the at least one position dedicated induction of items onto the line sorter, is at the lower track section and/or at the upper track section. Induction may be carried out manually, by one or more operators placing items on the sorter at such position(s) dedicated induction. Alternatively or additionally, items may be placed on the sorter utilising one or more robots. Alternatively or additionally, items may be placed on the sorter utilising an induction comprising a number of conveyor belts leading the items to the sorter.

Independent of the manner of inducting items, the at least one position dedicated induction of items onto the line sorter may alternatively or additionally be provided at an end track section, such as e.g. for placing the items on item transport surfaces just after the surfaces has entered the upper track section.

According to embodiments of the invention, the plurality of discharges are provided along the lower track section and/or the upper track section and/or one of the end track sections. It may be seen as preferred to position the discharges at or along the upper track section.

In a second aspect, the invention provides use of a line sorter according to the first aspect in an airport, a distribution centre or in another sorting facility.

In a third aspect, the invention provides a method of sorting individual item pieces using the line sorter according to the first aspect.

In a fourth aspect, the invention provides a method of adjusting a length of a track loop of a line sorter for sorting items of various shapes, sizes and weights, such as postal parcels or airport baggage, the method comprising providing a track loop formed by an upper track section, a lower track section, one end track section connecting the upper and lower track sections at each of two ends of the line sorter, and at least one movably mounted adjustment element, wherein at least one of the end track sections is mounted so as to allow longitudinal displacement of said end track section relative to the upper and lower track sections, and wherein the at least one adjustment element is located between said end track section and an end of one of the upper and lower track sections, and wherein the at least one adjustment element has a wedge shaped portion arranged for adjustable engagement with a correspondingly shaped portion of one of: said end track section, and said end of one of the upper and lower track sections, providing a closed loop of coupled sorting carts or slats coupled at couplings and being arranged for moving along said closed loop track, displacing said end track section relative to the upper and lower track sections, so as to adjust a length of the track loop, and moving the adjustment element to adjust engagement of said wedge shaped portion with said correspondingly shaped portion in accordance with said displacement of said end track section, preferably so as to at least reduce a gap in the track loop.

The line sorter is particularly useful in an airport, a distribution centre, such as a postal distribution centre or in any other sorting facility, and particularly for sorting individual item pieces.

By referring to an advantage herein, it must be understood that this advantage may be seen as a possible advantage provided by the invention, but it may also be understood that the invention is particularly, but not exclusively, advantageous for obtaining the described advantage.

In general, the various aspects and advantages of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which

FIG. 2 is a partial cut-away perspective view, seen from one end,

FIG. 3 is a side view of one end of the line sorter with carts on the track loop, FIG. 4 shows a detail showing adjustment elements interfacing left and right side track parts of an upper track of the line sorter, FIG. 5 shows a detail of an adjustment element held in place by a spring arrangement, FIGS. 6 and 7 illustrate two perspective views of an end track section, FIG. 8 shows one side of an end track section with a part being displaceable and being mounted with springs.

DESCRIPTION OF EMBODIMENTS

Figure 1A:
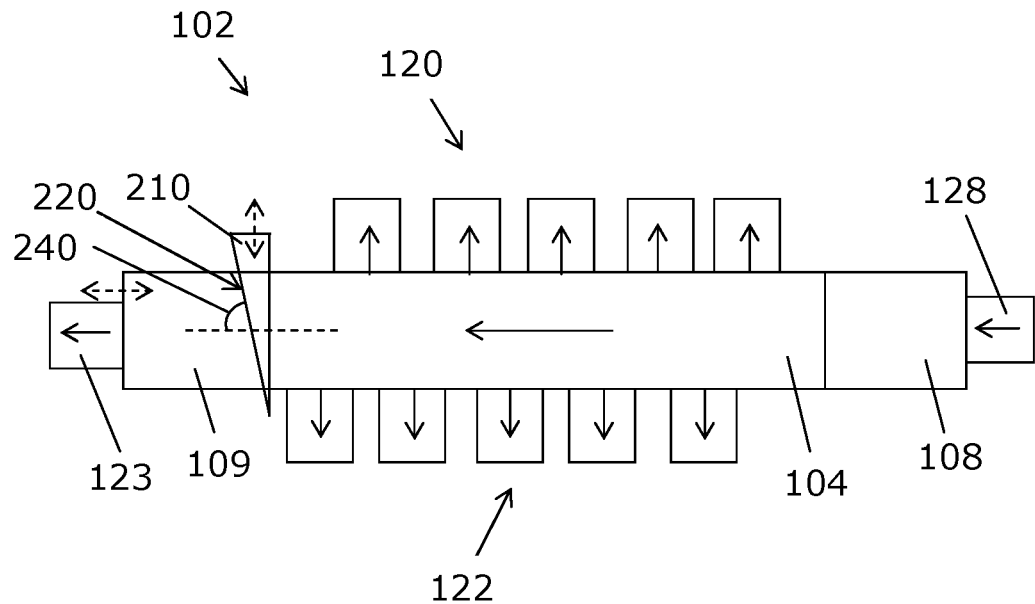
FIGS. 1a and 1b show a simple sketch of a line sorter embodiment in top view and in side view.
Figure 1B:
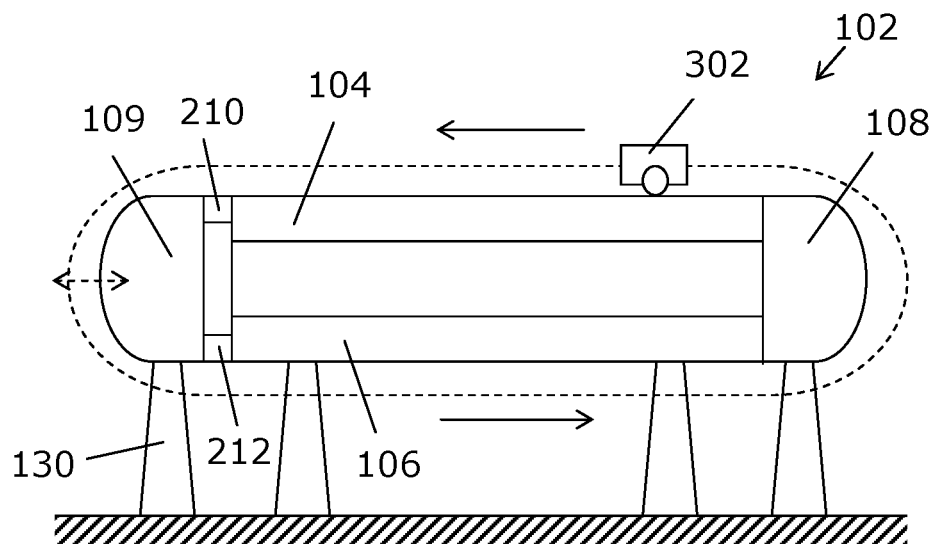

FIG. 1a shows a sketch of a line sorter embodiment 102 in a top view, and FIG. 1b shows the corresponding line sorter 102 in a side view with one single sorting cart or slat 302 of the closed loop of coupled sorting carts or slats being visible. The line sorter 102 is adapted for sorting items of various shapes, sizes and weights, such as postal parcels or airport baggage. FIG. 1a shows an induction 128, e.g. a conveyor, for induction of sorting items and discharges 120, e.g. a chute, positioned to the right along an upper track section 104 of the sorter 102, discharges 122 positioned to the left along an upper track section 104 of the sorter 102, and a discharge 123 at the end opposite the end of the induction 128. The discharges 120, 122 serve to allow discharge of items for sorting the items into their respective discharge, i.e. the discharges, which may also be referred to as chutes, are provided to receive the items which are discharged from the sorter. E.g. the discharges 120, 122 may have chutes to lead the items away from the line sorter 102. The end discharge 123 is used for re-circulation of items, if needed. Arrows on the induction 128 and discharges 120, 122, 123 indicate item directions to and from the line sorter 102.

It follows that the sorter is provided in an over/under configuration, i.e. where the upper track section 104 is provided in line with, but directly above the lower track section 106, i.e. forming an endless closed track loop. The arrow on the upper track section 104 indicates direction of movement of a closed loop of coupled sorting carts or slats 302 (not visible on FIG. 1a) coupled at couplings and being arranged for moving along the endless track loop formed by the upper track section 104, a lower track section 106, and one end track section 108, 109 connecting the upper and lower track sections 104, 106 at each end of the line sorter 102.

One end track section 109 in this embodiment is mounted so as to allow longitudinal displacement, indicated by the dashed double arrow on the end track section 109, relative to the upper and lower track sections 104, 106. As seen, two adjustment elements 210, 212 form part of the track loop. One adjustment element 210 is movably mounted in directions indicated by the dashed double arrow on the adjustment element 210, i.e. transverse to a longitudinal axis formed by the line sorter 102. The adjustment element 210 is positioned between the displaceable end track section 109 and an end of the upper section 104. The adjustment element 210 is seen to have a wedge shaped portion arranged for adjustable engagement with a correspondingly shaped portion of the displaceable end track section 109, so as to allow adjustment of a length of the track loop in accordance with displacement of said end track section relative to the upper and lower track sections 104, 106.

Hereby, it is possible to match the length of the track loop to fit the length of the closed loop of sorting carts or slats 302, also in case its length is increased due to wear or high temperatures. This matching is possible by displacing the end track section 109, e.g. to increase the track loop length, by displacing the end track section 109 to the left on FIG. 1a. This leaves a gap in the track loop between the end track section 109 and the upper track section 104 which is filled by correspondingly moving the adjustment element 210, i.e. downwards on FIG. 1a. It is to be understood that the lower adjustment element 212 has a similar function to fill the gap between a lower part of the end track section 109 and the lower track section 106. The adjustment elements 210, 212 are preferably arranged such that they have surfaces in the same plane as the surface of the adjacent track parts, i.e. in the same plane as end track portions of the end track section 109 and the adjacent end of the upper or lower track sections, respectively. Hereby, it is possible for the adjustment elements 210, 212 to provide smooth track interfaces, thereby allowing a low acoustic noise and vibration level of the line sorter 102 even with carts or slats 302 moving at high speeds.

It is seen that the adjustment element 210 is movable along an axis being transverse to or at least substantially transverse to the longitudinal axis of the line sorter 102. In the illustration, the wedge shaped portion forms a straight track surface interface 220 with a correspondingly shaped portion of the end track section 109, thus forming a smooth track interface at all positions in the movable direction within the limit of the size of the adjustment element 210, and/or limited by a limiting track or limiting element (not shown). The track surface interface 220 may have another shape than straight, especially this may be preferred if only a limited adjustment is required, however for a larger adjustment, a straight track surface interface 220 may be preferred, and it is easy to manufacture the adjustment element 210 with a matching interface to the end track section 109 so as to provide a smooth track interface without a gap.

The straight track surface interface 220 in FIG. 1a is seen to form an angle 240 of such as in the range 60°-80°. It is to be understood that the adjustment element 210 may be shaped such that the straight track surface interface 220 forms an angle 240 in the range such as 10°-70°, or such as 20°-40°, depending e.g. on the required displacement of the end track section 109 which the adjustment element 210 needs to compensate for.

It is preferred that both the end track section 109 and the upper and lower track sections 104, 106 have plane track surfaces at the interface to the adjustment element, which also has a plane surface, so as to form a smooth track interface.

The line sorter 102 is supported by supporting elements 130 or legs, and these supporting elements 130 may be fixed to the floor or other structure below the line sorter 102. Especially, the displaceable end track section 109 is preferably designed such that it is supported by a supporting element which can be fixed while the end track section 109 is longitudinally displaced.

In FIGS. 1a and 1b, the line sorter 102 shown has, for simplicity, only one single wide track. It is to be understood that in general the line sorter 102 may have track sections 104, 106, 108, 109 which form two, three, four or even more parallel tracks, e.g. for each rolling element of the closed loop of coupled sorting carts or slats 302. Each of such tracks may be provided with separate adjustment elements 210, 211.

No propulsion means for the sorting carts or slats 302 are shown in FIGS. 1a and 1b, however it is to be understood that several types of propulsion means, as known in the art, can be provided. Especially, a magnetic drive based on one or more permanent magnets fixed to each sorting cart or slat 302 may be preferred with respect to energy consumption and a low acoustic noise and vibration level.

The magnetic drive preferably comprises a plurality of permanent magnets positioned after each other in the moving direction of the carts, links or slats as a row of magnets. The magnets preferably have a constant pitch and alternating polarity. Preferably a single row of magnets is provided.

In the following, a specific line sorter embodiment will be described in connection with FIGS. 2-8.

Figure 2:
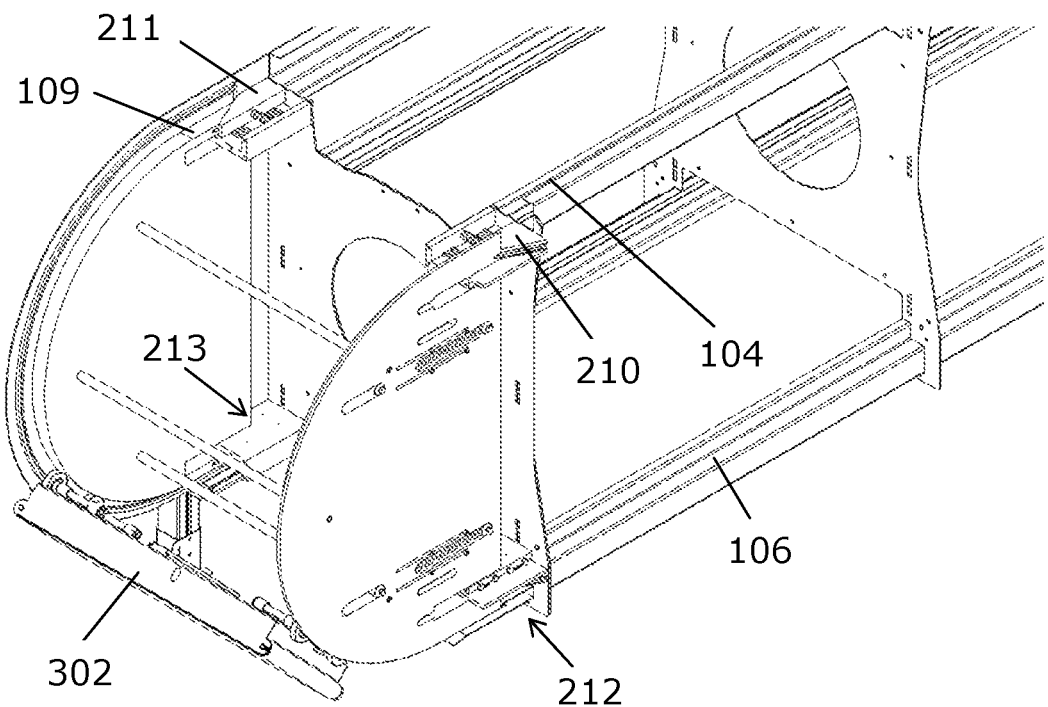
FIGS. 2-8 show different views of another line sorter embodiment.

FIG. 2 shows a more detailed partly cut away perspective view of the specific line sorter embodiment, where one end is visible showing a plane upper track section 104, a plane lower track section 106 being parallel with the upper track section 104, and an end track section 109 which is mounted so that it can be displaced parallel with planes formed by the parallel upper and lower track sections 104, 106. This line sorter embodiment has two parallel tracks, and thus all of its track sections 104, 106, 109 (and the opposite end track section not visible) have two parallel track sections. One sorting cart 302 with two wheels on each track is shown on a part of the end track section 109.

Two adjustment elements 210, 211 are positioned at respective sides of the line sorter for interfacing the displaceable end track section 109 and the upper track section 104. One adjustment element 210 is positioned at one side for interfacing one track, and one adjustment element 211 is positioned at the other side for interfacing the opposite track. The end track section 109 has plane track portions adjacent to the adjustment elements 210, 211, and otherwise it has curved, semi-circular track sections.

A set of similar adjustment elements 212, 213, not clearly visible on this view, are positioned to provide track interfaces between lower track parts of the end track section 109 and the lower track section 106. Thus, altogether four adjustment elements 210, 211, 212, 213 are used to provide track interfaces between the end track section 109 and the upper and lower track sections 104, 106. All of these adjustment elements 210, 211, 212, 213 are movably mounted in brackets which may be fixed to the upper and lower track sections 104, 106, respectively. These brackets may alternatively be fixed to and end frame of one unit comprising the end track section 109, thus allowing manufacturing an end unit comprising the end track section 109 with the adjustment elements 210, 211, 212, 213. This unit can then be fastened to an end part of the upper and lower track sections 104, 106 during final assembly of the line sorter 102.

Figure 3:
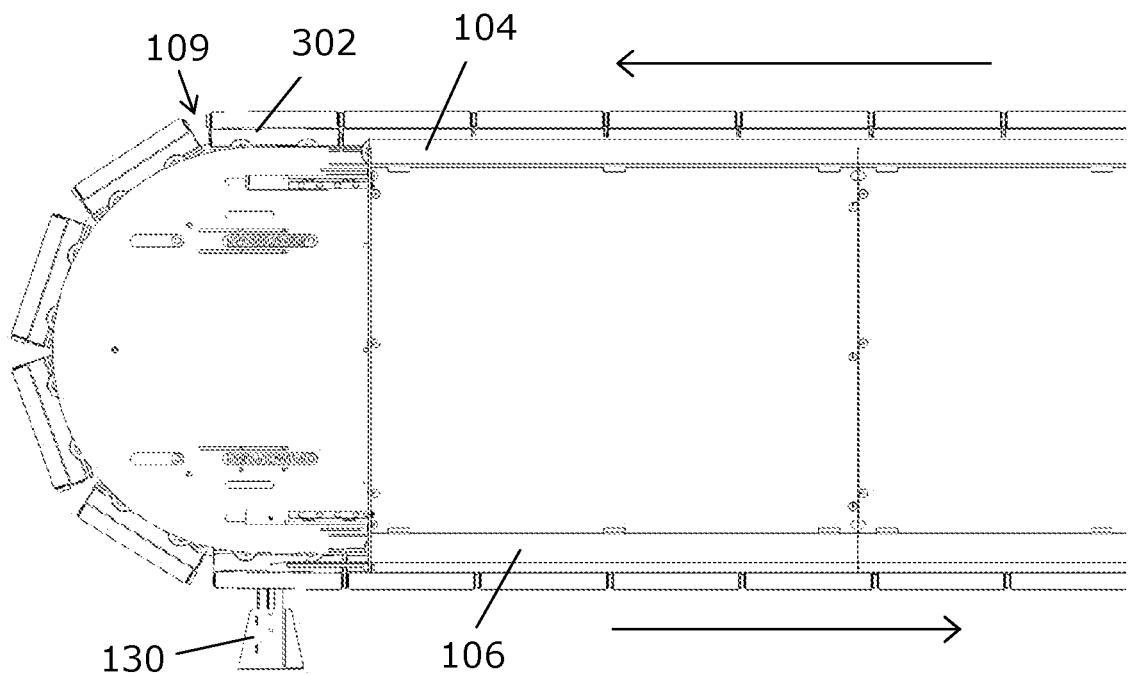

FIG. 3 shows a side view of the same part of the line sorter as in FIG. 2, however here the closed loop of sorting carts 302 is visible. Moving directions are indicated with arrow. Of course the moving direction could also be the reverse of that indicated. Further, a supporting leg 130 is indicated for supporting an end unit comprising the end track section 109. To allow the end track section 109 to be horizontally displaceable in relation to the fixed positioned leg 130, the end track section 109 is structurally connected with the supporting leg 130 by means of tracks, to be explained in more details later.

Figure 4:
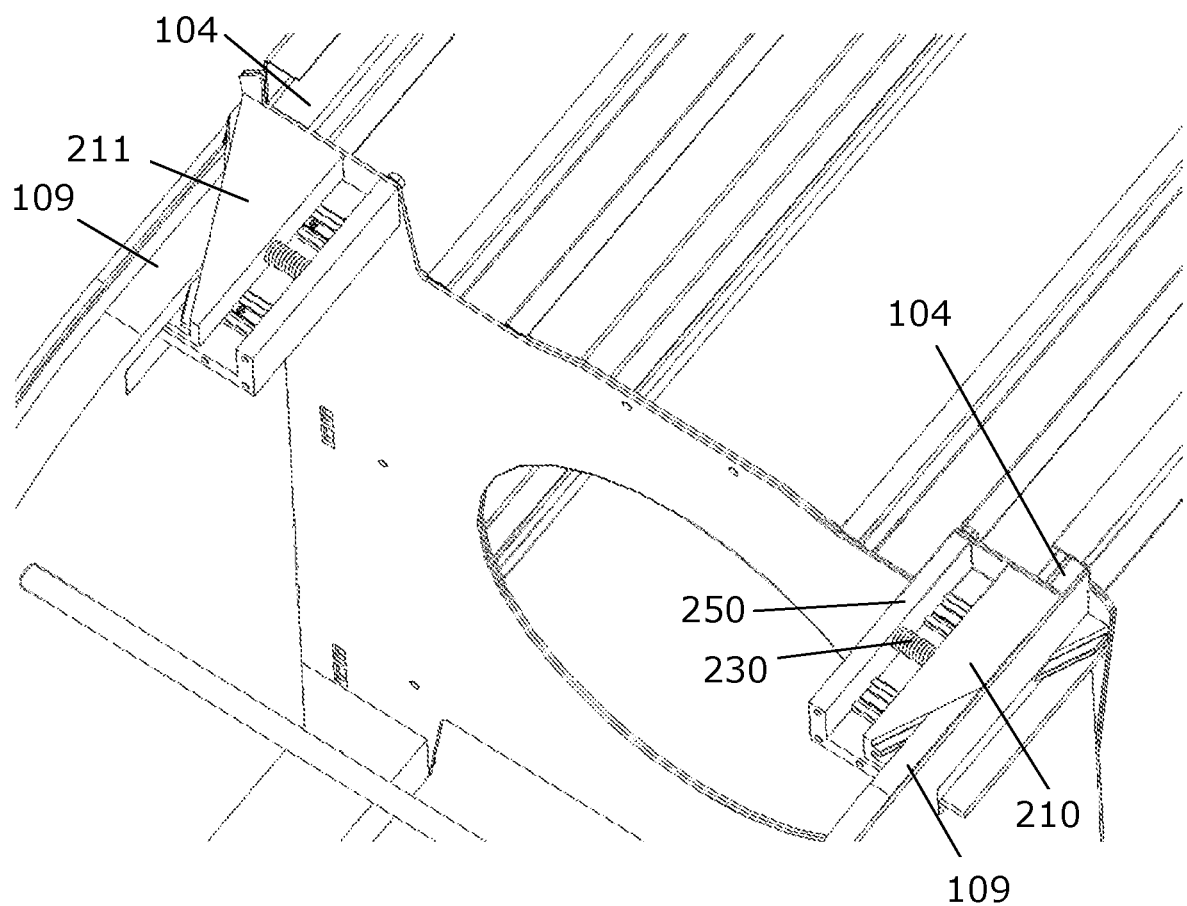
Figure 5:
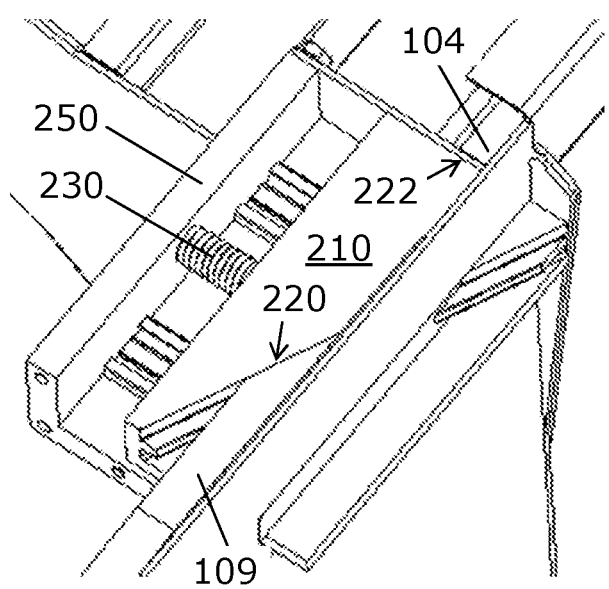

FIGS. 4 and 5 show in more detail the adjustment elements 210, 211 and their wedge shaped part which forms a straight line track interface 220 with tracks on both sides of the end track section 109. The adjustment elements 210, 211 are generally triangular shaped, when seen in top view, thus providing a wedge shaped interface with track parts of the end track section 109.

Referring now to FIG. 5, it is seen that the adjustment element 210 is mounted in a bracket 250 which may be structurally fixed to and end frame of a unit comprising the end track section 109. A track in the bracket 250 serves to guide the adjustment element 210 so that it can move back and forth in a direction transverse to the longitudinal axis of the line sorter, and the adjustment element 210 may have a part forming a straight perpendicular track interface 222 to the upper track section 104.

A spring 230 is mounted to apply a force between the bracket 250 and the adjustment element 210. Hereby, the adjustment element 210 is forced to move outwards so as to bring its wedge shaped part into contact with the end track section 109 at the straight line interface 220. Thus, due to the spring 230, the adjustment element 210 will automatically close the gap at the track interface 220 upon displacement of the end track section 109. The surface of the adjustment element 210 is preferably plane, and the adjustment element 210 is preferably mounted in the bracket 250 such that its plane surface forms plane and smooth track interfaces 220, 222 with the end track section 109 as well as the upper track section 104.

Figure 6:
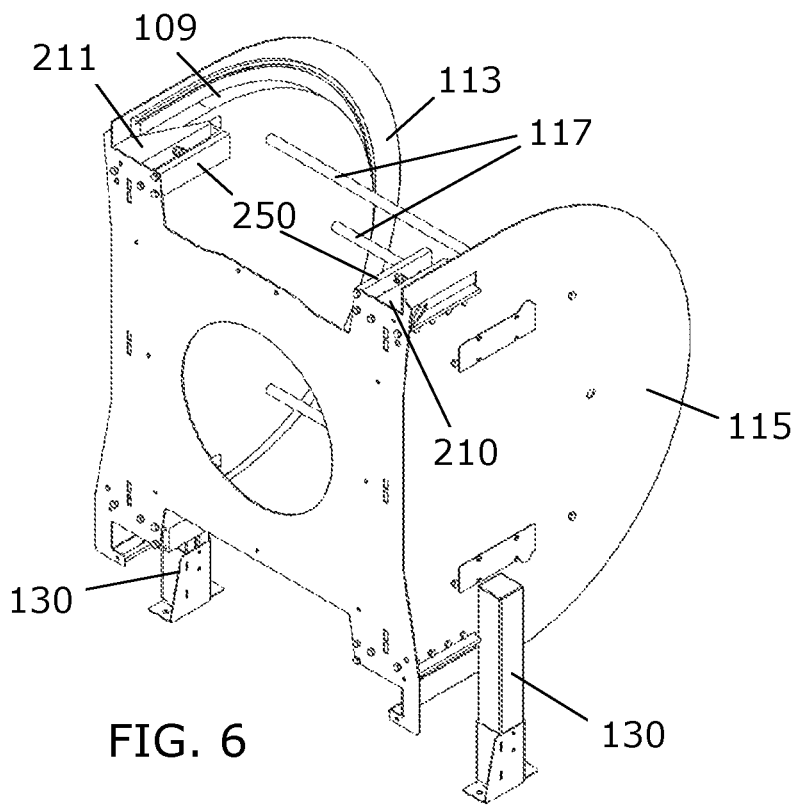
Figure 7:
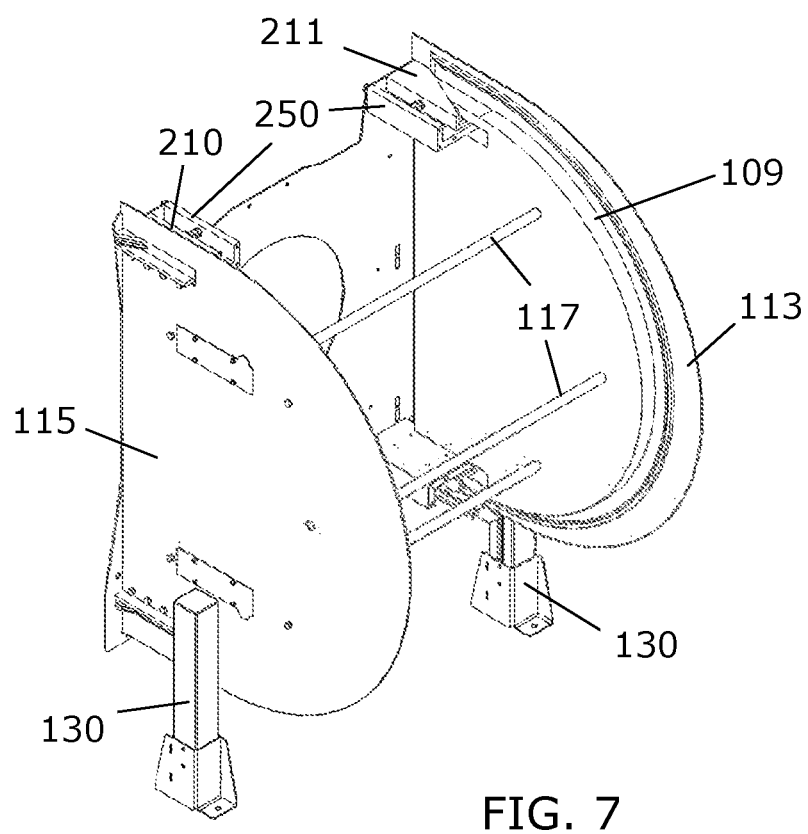

FIGS. 6 and 7 show details of the end track section 109 in two different perspective views. In the shown embodiment, the end track section 109 is constituted by a semi-circular plastic element having a thickness of 60 mm. The end track section 109 is mounted on two generally semi-circular shaped plate elements 113, 115 extending to support the end track section 109. Rods 117 serve to structurally connect the two plate elements 113, 115. The end track section 109 is structurally connected with the plate elements 113, 115 via a sliding arrangement, one sliding arrangement on each of the plate elements 113, 115, serving to vertically support the end track section 109, and at the same time allow the end track section 109 to be displaced horizontally in a longitudinal direction in relation to the two plate elements 113, 115, and thus also to upper and lower track sections (not shown in FIGS. 6 and 7).

When the line sorter is fully mounted for normal operation, the plate elements 113, 115 are structurally fixed to the upper and lower track sections (not shown in FIGS. 6 and 7). As seen, the plate elements 113, 115 are fixed to an end frame which together with the end track section 109 constitutes an end unit. The brackets 250 carrying the adjustment elements 210, 211 may be fixed to both the end frame of the end track section 109 and to the plate elements 113, 115. Each of the plate elements 113, 115 is also fixed to at least one supporting leg 130, thus serving to vertically support the end track section 109 via the plate elements 113, 115.

Figure 8:
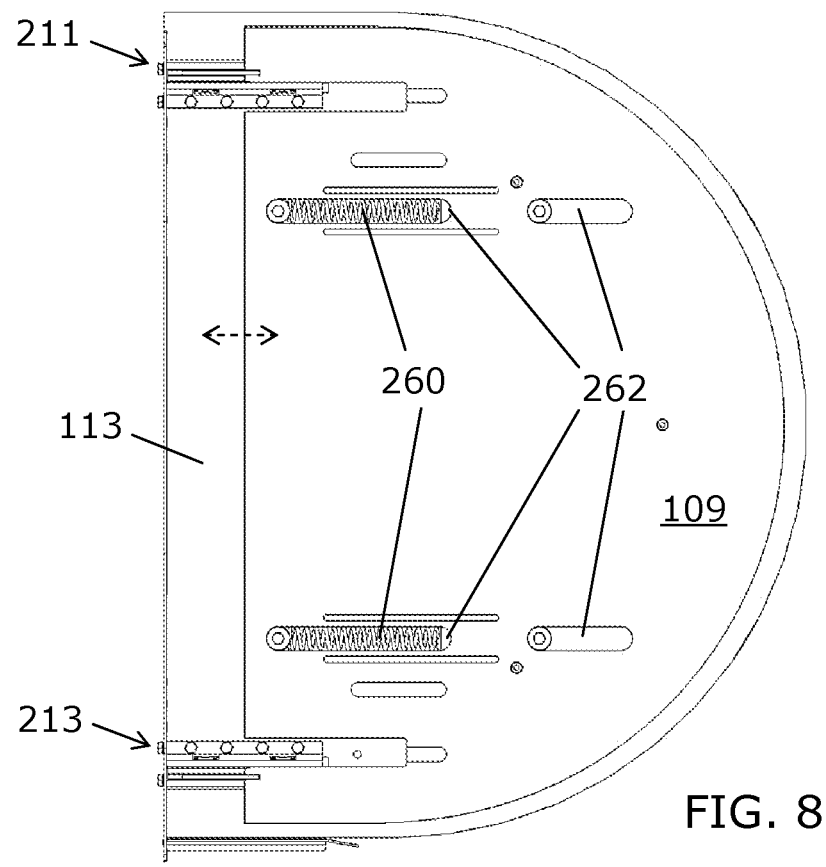

FIG. 8 shows a side view of one side of an end unit comprising the end track section 109, wherein the end unit is seen from the inside. The end unit comprises the track section 109 which is formed by a vertical and semi-circular shaped plastic plate element. The end track section 109 has slits or tracks 262 serving for vertically supporting the end track section 109 via the plate element 113. The longitudinal extension of the tracks 262 serve to limit the longitudinal, i.e. horizontal, displacement of the end track section 109 relative to the plate elements 113, 115.

Two horizontal springs 260, an upper and a lower spring, serve to force a displacement of the end track section 109 longitudinally in a direction away from the upper and lower track sections (not shown on FIG. 8). Hereby, the springs 260 serve to increase the length of the track loop, and by matching the force of the springs 260, the length of the track loop can be self-adjusting to match variations in the length of the closed loop of coupled sorting carts or slats (not shown on FIG. 8). Especially, the springs 260 may be designed to provide a constant or substantially constant tension in the closed loop of coupled sorting carts or slats. It may be necessary to mount more than two springs 260 to obtain a desired force.

In the shown embodiment in FIGS. 2-8, a spring 230 has been shown to control the motion of the adjustment elements 210, 211, 212, 213. Alternatively, or additionally, controllable actuators such as electric, hydraulic or pneumatic actuators may be used to control movement and/or tension of the adjustment elements 210, 211, 212, 213. Likewise, controllable actuators may be used to control the longitudinal displacement of the end track section 109, alternatively, or additionally to the shown spring arrangement 260.

Figure 9:
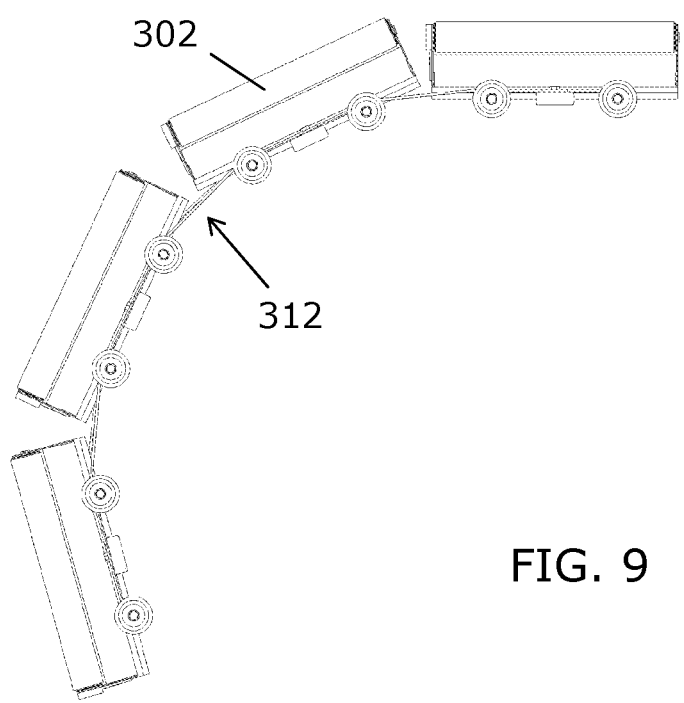
FIG. 9 shows an example of coupled sorting carts or slats in a side view.

FIG. 9 illustrates an example of sorting carts 302 linked with couplings 312 so as to form the endless loop of carts. The couplings 312 enable the carts to pivot relative to each other around a pivot axis, in particular, or moreover, when the carts follow or substantially follow the curve form of the end track sections. Two sets of carrying wheels are shown on each cart 302 for vertically carrying the cart 302 on the track. A horizontal guiding wheel may or may not be provided.

In short, the invention provides a line sorter for sorting items of various shapes, sizes and weights, in particular postal parcels or airport baggage. The line sorter has a closed loop of coupled sorting carts or slats provided for moving along a loop track formed by an upper track section, a lower track section, one end track section connecting the upper and lower track sections at each of two ends of the line sorter, and one or more adjustment elements also forming part of the track loop. One of the end track sections can be longitudinally displaced relative to the upper and lower track sections to increase or decrease the resulting length of the track loop. The adjustment element(s) is movably mounted between said end track section and an adjacent upper or lower track section. A wedge shaped portion of the adjustment element is arranged for adjustable engagement with a correspondingly shaped portion of said end track section, or the upper or lower track section. This allows adjustment of a length of the track loop in accordance with displacement of said end track section, and still close a gap in the track by means of the adjustment element.

Although the present invention has been described in connection with preferred embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Reference signs are included in the claims. However the inclusion of the reference signs is only for clarity reasons and should not be construed as limiting the scope of the claims.

The invention claimed is:

1. A line sorter for sorting items of various shapes, sizes and weights, the line sorter comprising
an upper track section, a lower track section, one end track section connecting the upper and lower track sections at each of two ends of the line sorter, wherein at least one of the end track sections is mounted so as to allow longitudinal displacement of said end track section relative to the upper and lower track sections,
at least one adjustment element, wherein the upper track section, the lower track section, and the end track sections form a track loop together with the adjustment element,
a closed loop of coupled sorting carts or slats coupled at couplings and being arranged for moving along the track loop,
at least one position dedicated induction of items onto the sorter by an induction,
a plurality of discharges for sorting one or more items into their respective discharge, wherein the at least one adjustment element is movably mounted between said end track section and an end of one of the upper and lower track sections, wherein the at least one adjustment element has a wedge shaped portion arranged for adjustable engagement with a correspondingly shaped portion of one of: said end track section, and said end of one of the upper and lower track sections, so as to allow adjustment of a length of the track loop in accordance with displacement of said end track section relative to the upper and lower track sections, and a controllable actuator arranged to move the at least one adjustment element both in and out of engagement with said correspondingly shaped portion so as to allow increasing or decreasing the length of the track loop.

2. The line sorter according to claim 1, wherein at least a first adjustment element is located to provide a track interface between an upper part of said end track section and an end of the upper track section, and wherein at least a second adjustment element is located to provide a track interface between a lower part of said end track section and an end of the lower track section.

3. The line sorter according to claim 1, wherein the wedge shaped portion of the at least one adjustment element is arranged for adjustable engagement with a correspondingly shaped portion of said end track section.

4. The line sorter according to claim 3, wherein the at least one adjustment element has a portion arranged to fit to an end of one of the upper or lower track sections.

5. The line sorter according to claim 1, comprising a spring arrangement serving to force the wedge shaped portion of the at least one adjustment element into engagement with said correspondingly shaped portion so as to close a gap in the track loop.

6. The line sorter according to claim 1, comprising a spring arrangement serving to force said end track section away from the upper and lower track sections, so as to increase the length of the track loop.

7. The line sorter according to claim 1, wherein the adjustment element is movable at least along a direction in one plane.

8. The line sorter according to claim 1, wherein the adjustment element has a plane surface aligned with surfaces of adjacent surfaces of the end track section and an adjacent upper or lower track section, so as to provide a smooth track.

9. The line sorter according to claim 1, comprising a linear synchronous motor propulsion system arranged for moving said closed loop of coupled sorting carts or slats along the loop track, the linear synchronous motor propulsion system comprising a stationary travelling field stator cooperating with a plurality of permanent magnets positioned on the carts or slats.

10. The line sorter according to claim 1, wherein a plurality of said carts or slats have a set of rolling devices arranged for operably interaction with the loop track.

11. The line sorter according to claim 10, wherein the set of rolling devices is a set of wheels.

12. The line sorter according to claim 1, wherein a plurality of, or each, cart or slat in the closed loop of coupled sorting carts or slats comprises one or more transport surfaces for receiving, transporting and/or discharging the items.

13. The line sorter according to claim 1, where the at least one position dedicated induction of items onto the line sorter, is at the lower track section and/or the upper track section and/or at an end track section.

14. The line sorter according to claim 1, where the plurality of discharges are provided along the lower track section and/or the upper track section and/or one of the end track sections.

15. The line sorter according to claim 1, where the controllable actuator is arranged to move the end track section in two directions so as to allow increasing or decreasing the length of the track loop.

16. The line sorter according to claim 1, wherein the adjustment element is movable along an axis being transverse or substantially transverse to a direction of motion of the sorting carts or slats when in operation.

17. A line sorter for sorting items of various shapes, sizes and weights, the line sorter comprising an upper track section, a lower track section, one end track section connecting the upper and lower track sections at each of two ends of the line sorter, wherein at least one of the end track sections is mounted so as to allow longitudinal displacement of said end track section relative to the upper and lower track sections, at least one adjustment element, wherein the upper track section, the lower track section, and the end track sections form a track loop together with the adjustment element, a closed loop of coupled sorting carts or slats coupled at couplings and being arranged for moving along the track loop, at least one position dedicated induction of items onto the sorter by an induction, a plurality of discharges for sorting one or more items into their respective discharge, wherein the at least one adjustment element is movably mounted between said end track section and an end of one of the upper and lower track sections, wherein the at least one adjustment element has a wedge shaped portion arranged for adjustable engagement with a correspondingly shaped portion of one of: said end track section, and said end of one of the upper and lower track sections, so as to allow adjustment of a length of the track loop in accordance with displacement of said end track section relative to the upper and lower track sections, and a controllable actuator arranged to move the end track section relative to the upper and lower track sections, so as to allow adjustment of the length of the track loop by moving the end track section in two directions so as to allow increasing or decreasing the length of the track loop.

18. A method of adjusting a length of a track loop of a line sorter for sorting items of various shapes, sizes and weights, the method comprising providing a track loop formed by an upper track section, a lower track section, one end track section connecting the upper and lower track sections at each of two ends of the line sorter, and a movably mounted adjustment element, wherein at least one of the end track sections is mounted so as to allow longitudinal displacement of said end track section relative to the upper and lower track sections, and wherein the at least one adjustment element is located between said end track section and an end of one of the upper and lower track sections, and wherein the at least one adjustment element has a wedge shaped portion arranged for adjustable engagement with a correspondingly shaped portion of one of: said end track section, and said end of one of the upper and lower track sections, providing a closed loop of coupled sorting carts or slats coupled at couplings and being arranged for moving along said closed loop track, providing a controllable actuator arranged to move the at least one adjustment element both in and out of engagement with said correspondingly shaped portion so as to allow increasing or decreasing the length of the track loop, displacing said end track section relative to the upper and lower track sections, so as to adjust a length of the track loop, and with the controllable actuator, moving the adjustment element to adjust engagement of said wedge shaped portion with said correspondingly shaped portion in accordance with said displacement of said end track section so as to at least reduce a gap in the track loop.

\* \* \* \* \*